UNITED STATES PATENT OFFICE.

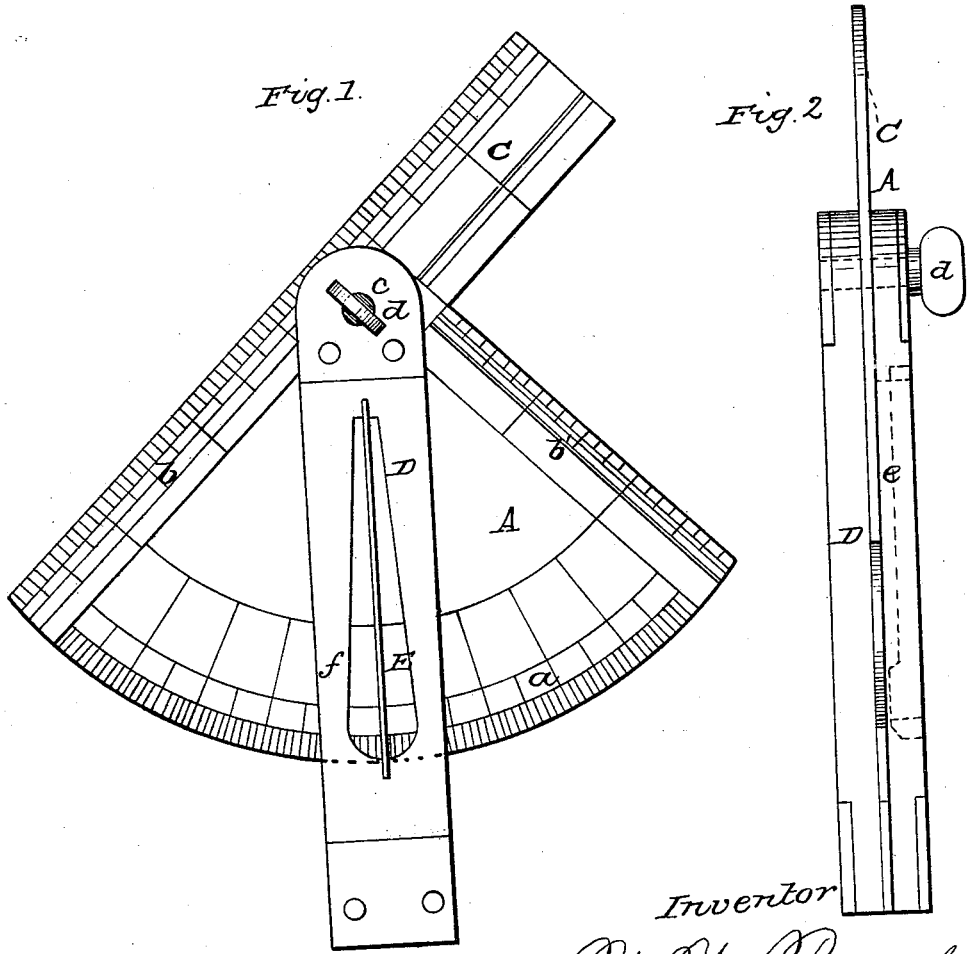

W. W. BRANCH, JR., OF MADISON, OHIO.

IMPROVEMENT IN PROTRACTING-BEVELS.

Specification forming part of Letters Patent No. 53,397, dated March 27, 1866.

*To all whom it may concern:*

Be it known that I, W. W. BRANCH, Jr., of Madison, in the county of Lake and State of Ohio, have invented a new and Improved Protracting-Bevel; and I do hereby declare that the following is a full, clear, and exact description thereof, which will enable others skilled in the art to make and use the same, reference being had to the accompanying drawings, forming part of this specification, in which—

Figure 1 represents a face view of this invention. Fig. 2 is an end view of the same.

Similar letters of reference indicate like parts.

This invention consists in combining with an ordinary bevel a protractor in such a manner that by a suitable index secured in the stock of the bevel the number of degrees to which the bevel is set or to which it is to be set can be ascertained at a glance, and polygons of any desired description or angular pieces of wood or any other material can be laid out with the greatest ease and facility.

A represents the protractor, made of brass or any other suitable material, and marked with a scale, $a$, comprising the number of degrees from 0 to 90. On each edge of the protractor is a margin, $b\ b'$, marked with inches and their fractions, and said protractor may be made with or without the extension-blade C.

In the corner of the contractor is a hole, $c$, the center of which coincides exactly with the center of the circle of which the curved edge of the protractor forms a segment, and through this hole passes a thumb-screw, $d$.

D is the stock, which is provided with a slit, $e$, through which the protractor passes, as clearly shown in Fig. 2, and the thumb-screw $d$ forms the connection between the stock and protractor. By tightening the thumb-screw the protractor can be secured in any desired position.

Screwed in the stock D is the index E in an opening, $f$, which may be square, round, or of any other form or shape, said index being made of a thin metal plate, which coincides exactly with a radial line drawn through the center of the thumb-screw $d$.

In order to use the tool the operator loosens the thumb-screw $d$ and moves the protractor through the stock until the index points to the desired degree; then with the thumb-screw he fastens the same firmly in its place, and by flaring the stock against the edge of the board or other article to be marked off he can draw a line along the edge of the protractor. When the protractor is provided with the extension-blade C the lines thus drawn are more clearly defined at their ends, and the operator is enabled to follow said lines with greater accuracy from the edge of the board or other article marked than he can if the extension is not applied.

This tool is of great utility in laying out work for many trades. For instance, if a mechanic desires to break a molding around an eight-square column, he can do it with the greatest ease and accuracy by adjusting my protracting-bevel to twenty-two and a half degrees, whereas without the same he is obliged to describe a circle, divide it into eight parts, join the points by the chords, and draw the radii, which requires much time. By my tool much time and labor are saved and the work to be executed can be laid out with the greatest ease and accuracy.

What I claim as new, and desire to secure by Letters Patent, is—

The combination of the protractor $a$, margin edges $b\ b$, extension-blade C, stock D, and index E, arranged and operating in the manner and for the purpose herein specified.

W. W. BRANCH, JR.

Witnesses:
 FRANKLIN PAINE, Jr.,
 JNO. L. BRANCH.